(12) United States Patent
Gu et al.

(10) Patent No.: US 10,671,518 B2
(45) Date of Patent: Jun. 2, 2020

(54) WHITE-BOX TESTING

(71) Applicant: EMC Corporation, Hopkinton, MA (US)

(72) Inventors: Forrest Weiyi Gu, Shanghai (CN); Martin Yang Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 413 days.

(21) Appl. No.: 15/263,839

(22) Filed: Sep. 13, 2016

(65) Prior Publication Data

US 2017/0075801 A1 Mar. 16, 2017

(30) Foreign Application Priority Data

Sep. 16, 2015 (CN) .......................... 2015 1 0590352

(51) Int. Cl.
*G06F 9/44* (2018.01)
*G06F 11/36* (2006.01)

(52) U.S. Cl.
CPC ............... *G06F 11/3688* (2013.01)

(58) Field of Classification Search
CPC .................................................. G06F 11/3688
USPC ........................................................ 717/124
See application file for complete search history.

(56) References Cited

U.S. PATENT DOCUMENTS

| 8,276,123 B1 * | 9/2012 | Deng .................. G06F 11/3688 714/37 |
| 2016/0085663 A1 * | 3/2016 | Best .................... G06F 11/3684 714/38.1 |
| 2017/0286258 A1 * | 10/2017 | Coulthard ........... G06F 11/3664 |
| 2017/0371304 A1 * | 12/2017 | Gupta ..................... G05B 9/02 |

* cited by examiner

*Primary Examiner* — Qamrun Nahar
(74) *Attorney, Agent, or Firm* — Brian J. Colandreo; Mark H. Whittenberger; Holland & Knight LLP

(57) ABSTRACT

Embodiments of the present disclosure provide a method, computer program product and apparatus for a white-box testing by determining a code line being changed in a target version of codes, determining a function to which the code line belongs, determining, based on a first mapping from functions to test cases, a set of test cases corresponding to the function to which the code line belongs, thereby enhancing efficiency of automatic testing.

16 Claims, 5 Drawing Sheets

WHITE-BOX TESTING

RELATED APPLICATION

This application claim priority from Chinese Patent Application Number CN201510590352.1, filed on Sep. 16, 2015 at the State Intellectual Property Office, China, titled "METHOD AND APPARATUS FOR WHITE-BOX TEST," the contents of which is herein incorporated by reference in entirety

FIELD OF THE DISCLOSURE

Embodiments of the present disclosure generally relate to software test.

BACKGROUND FOR THE DISCLOSURE

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY OF THE DISCLOSURE

Embodiments of the present disclosure intend to provide a method and an apparatus for white-box test to ameliorate some of the know issues faced in software testing. Accordingly the present disclosure provides a method for white-box test that includes: determining a code line being changed in a target version of codes; determining a function to which the code line belongs; and determining, based on a first mapping from functions to test cases, a set of test cases corresponding to the function to which the code line belongs.

BRIEF DESCRIPTION OF THE DRAWINGS

The above and other objectives, features and advantages of the embodiments of the present disclosure will become easily understood by reading the detailed depiction below with reference to the accompanying drawings. Several embodiments of the present disclosure are illustrated in an exemplary, but not limitative, manner in the drawings, in which.

In respective drawings, same or corresponding reference numerals represent same or corresponding parts.

DETAILED DESCRIPTION

Figure 1:
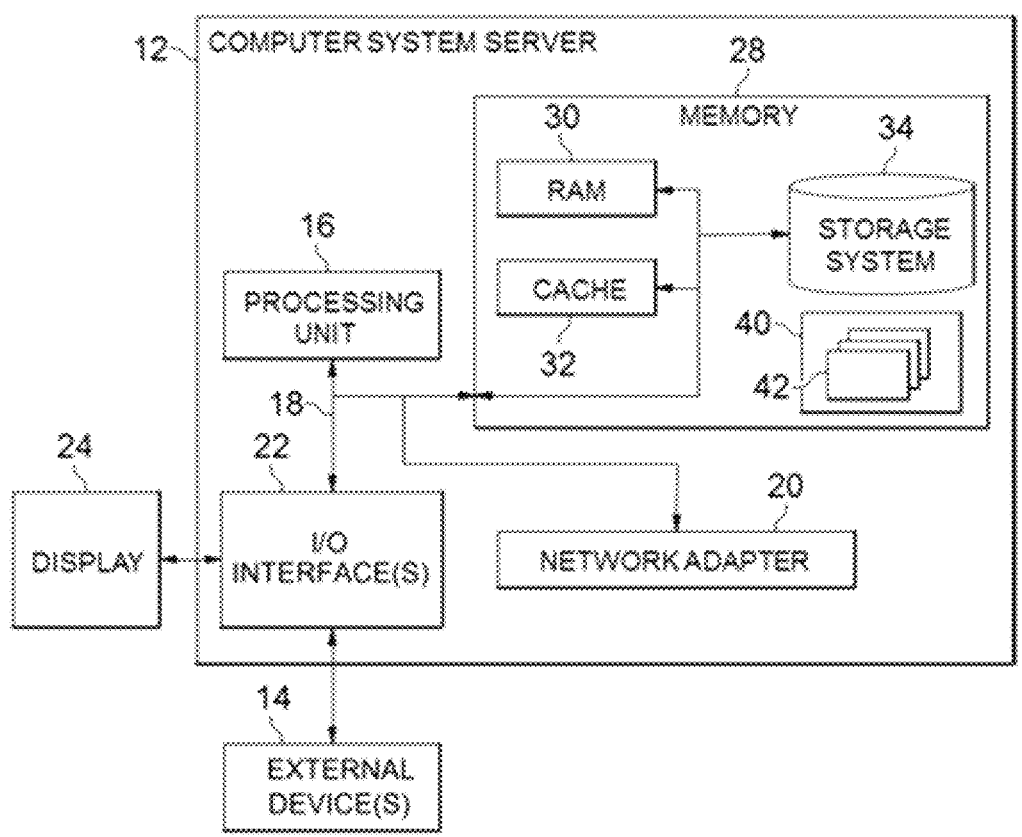
FIG. 1 illustrates a block diagram of an exemplary computer system/server 12 adapted to implement embodiments of the present disclosure.

Hereinafter, the principle of the present disclosure will be described with reference to several exemplary embodiments shown in the drawings. It should be noted that these embodiments are described only for enabling those skilled in the art to better understand and then further implement the present disclosure, not intended to limit the scope of the present disclosure in any manner.

The terms "comprising", "including" and their variants used herein should be understood as open terms, i.e., "comprising/including, but not limited to". The term "based on" means "at least partly based on". The term "an embodiment" represents "at least one embodiment"; the terms "another embodiment" and "a further embodiment" represent "at least one additional embodiment". Relevant definitions of other terms will be given in the description below.

Accordingly the present disclosure provides a method for white-box testing that includes: determining a code line being changed in a target version of codes; determining a function to which the code line belongs; and determining, based on a first mapping from functions to test cases, a set of test cases corresponding to the function to which the code line belongs. In some embodiments, determining a code line being changed in a target version of codes may include comparing a target version of codes with an original version of codes. A further embodiment may include determining, based on a result of comparing, a code line being changed in a target version of the codes. In some embodiments, determining a code line being changed in a target version of the codes may include determining a code line being deleted from an original version of the codes. A further embodiment may include determining a code line being modified from an original version of the codes. A further embodiment may include determining a code line being added from an original version of the codes.

In one embodiment, the method may further include: establishing a first mapping from functions to test cases. In some embodiments, establishing a first mapping from functions to test cases may include: establishing a second mapping from test cases to functions. A further embodiment may include generating a first mapping based on a second mapping. In some embodiments, establishing a second mapping from test cases to functions may include: determining, for an original version of the codes, a function call relationship in the codes. A further embodiment may include determining, based on a function call relationship and for each of the test cases, a set of functions corresponding to a test case. A further embodiment may include generating, based on a set of functions corresponding to each of the test cases, a second mapping.

In some embodiments, determining a function call relationship in the codes may include: analyzing a statement in the codes with a state machine. A further embodiment may include determining, based on a result of the analyzing, a list of functions included in the codes. A further embodiment may include determining, based on a list of functions, a function call relationship in the codes. In some embodiments, establishing a first mapping from functions to test cases may include establishing a first mapping for an original version of the codes. A further embodiment may include updating a first mapping for a target version of the codes.

According to another embodiment of the present disclosure, there is provided an apparatus for white-box testing. In one embodiment the apparatus may include a code change determining module that may be configured to determine a code line being changed in a target version of codes. A further embodiment may include a function determining module that may be configured to determine a function to which a code line belongs. A further embodiment may include a test case determining module that may be configured to determine, based on a first mapping from functions to test cases, a set of test cases corresponding to a function to which a code line belongs.

In some embodiments, a code change determining module may be configured to compare a target version of the codes with an original version of the codes. A further embodiment may be configured to determine, based on a result of the comparing, a code line being changed in a target version of the codes. In some embodiments, a code change determining module may be further configured to determine a code line being deleted from an original version of the codes. A further embodiment may be configured to determine a code line being modified from an original version of the codes. A further embodiment may be configured to determine a code line being added from an original version of the codes.

In one embodiment, the apparatus may further include a first mapping establishing module configured to establish a first mapping from functions to test cases. In some embodiments, a first establishing module may be configured to establish a second mapping from test cases to functions. A further embodiment may be configured to generate the first mapping based on a second mapping. In some embodiments, establishing a second mapping from test cases to functions may include: determining, for an original version of the codes, a function call relationship in the codes. A further embodiment may include determining, based on a function call relationship and for each of the test cases, a set of functions corresponding to a test case. A further embodiment may include generating, based on a set of functions corresponding to each of the test cases, a second mapping.

In some embodiments, determining a function call relationship in the codes may include analyzing a statement in the codes with a state machine. A further embodiment may include determining, based on a result of analyzing, a list of functions included in the codes. A further embodiment may include determining, based on the list of functions, a function call relationship in the codes. In some embodiments, a first mapping establishing module may be further configured to establish a first mapping for an original version of the codes. A further embodiment may be configure to update the first mapping for a target version of the codes.

According to a further embodiment of the present disclosure, there is provided a computer program product for white-box testing, the computer program product being tangibly stored on a non-transient computer-readable medium and comprising machine-executable instructions that, when being executed, cause a machine to execute steps of the method as disclosed above. Advantageously, embodiments of the present disclosure can select limited test cases based on a function call relationship to cover software features affected by code change, thereby enhancing efficiency of automatic test.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, system memory 28, and bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
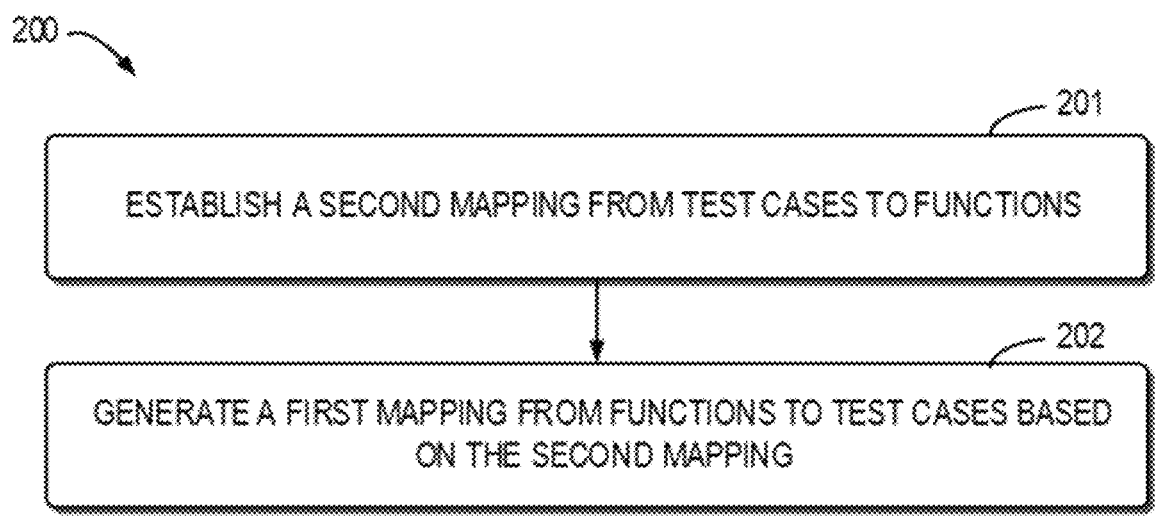
FIG. 2 illustrates a flow diagram of a method 200 for establishing a first mapping from functions to test cases according to an exemplary embodiment of the present disclosure.

Now, refer to FIG. 2, in which a flow diagram of a method 200 for establishing a first mapping from functions to test cases according to an embodiment of the present disclosure is shown. As discussed below, the first mapping therein is for determining a set of test cases to be selected. For example, method 200 may be implemented by computer system/server 12 described with respect to FIG. 1.

According to method 200, in step 201, a second mapping from test cases to functions is first established. In step 202, a first mapping from functions to test cases is generated based on the second mapping.

Figure 3:
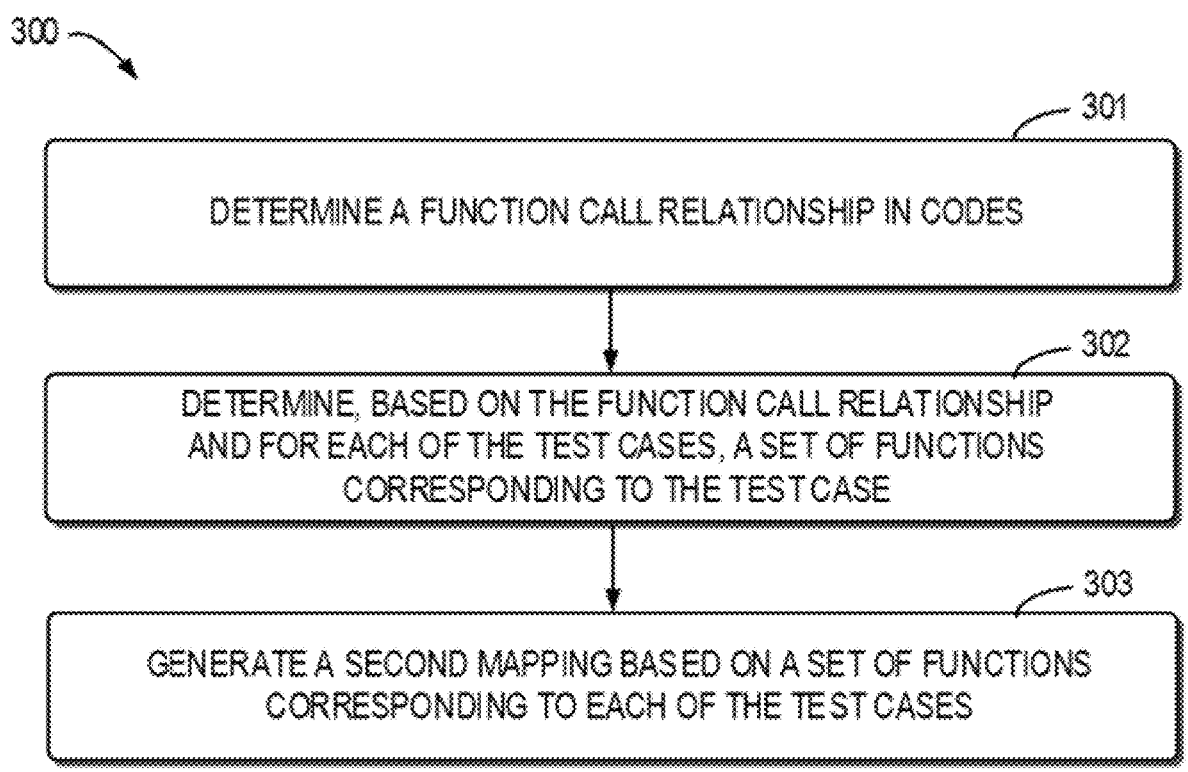
FIG. 3 illustrates a flow diagram of a method 300 for establishing a second mapping from test cases to functions according to an exemplary embodiment of the present disclosure.

For example, FIG. 3 illustrates a flow diagram of a method 300 for establishing a second mapping from test cases to functions according to an embodiment of the present disclosure. As shown in FIG. 3, first, a function call relationship in codes is determined (301). Next, based on the function call relationship and for each of the test cases, a set of functions corresponding to the test case is determined (302). Finally, a second mapping is generated based on a set of functions corresponding to each of the test cases (303).

In one embodiment, only for the purpose of illustration but not limitation, Python may be taken as an example to describe how to determine a function call relationship in the codes. According to a embodiments of the present disclosure, in order to determine a function call relationship in the codes, statements in the codes may be analyzed with a state machine. In an example embodiment, a state machine may be implemented to parse character strings in Python codes and process symbols such as parentheses, dot (indicating a call relationship), equal sign, etc., thereby extracting all statement elements in the Python codes. In a further embodiment, based on a result of analyzing, a list of functions included in the codes may be determined In an example embodiment, a determined list of functions may include information such as a name of a function included in the codes and a code line in which a function is located. In one embodiment, based on such information, a call relationship between respective functions in the codes may be further determined, i.e., which functions may be called by each function in the list of functions may be determined. In an example embodiment, a call relationship between respective functions in Python codes may be determined based on indent usage in Python codes. In some embodiments, it should be understood that besides the method described above, a function call relationship in the codes may also be obtained through any existing or future developed lexical or grammatical analytic tool (e.g., Pylint tool for Python). In an additional embodiment, a programming language may not be limited to Python, but may include any existing or future developed programming languages. In a further embodiment, based on a function call relationship and for each of the test cases, a set of functions corresponding to a test case may be determined (302). In an example embodiment, all functions related to each of test cases may be determined based on a function call trace obtained by executing a test case. In a further embodiment, a second mapping may be generated based on a set of functions corresponding to each of the test cases (303).

Again, return to FIG. 2, method 200 then proceeds to step 202. In step 202, a first mapping from functions to test cases is generated based on the second mapping. As described above, in a certain embodiment, a second mapping indicates a set of functions corresponding to each of the test cases. In a further embodiment, based on a second mapping, a first mapping indicating a set of test cases associated with each of the functions may be generated. In a further embodiment a first mapping will be used to determine a set of test cases to be selected for code change.

According to an embodiment of the present disclosure, a first mapping from functions to test cases may be determined for an original version of the codes. In a further embodiment, an original version refers to a version of the codes being unchanged (to be distinct from a target version hereinafter, i.e., a version of the codes being changed). In an additional embodiment, for example, when some functions have been deleted or some functions have been newly added in a target version of the codes from an original version of the codes, a first mapping from functions to test cases may be updated for the target version of the codes. In an example embodiment, steps for updating a first mapping may be identical to that for establishing the first mapping, or some steps therein may be omitted depending on specific situations. For the sake of simplifying the depiction, further detailed depiction is omitted here.

Figure 4:
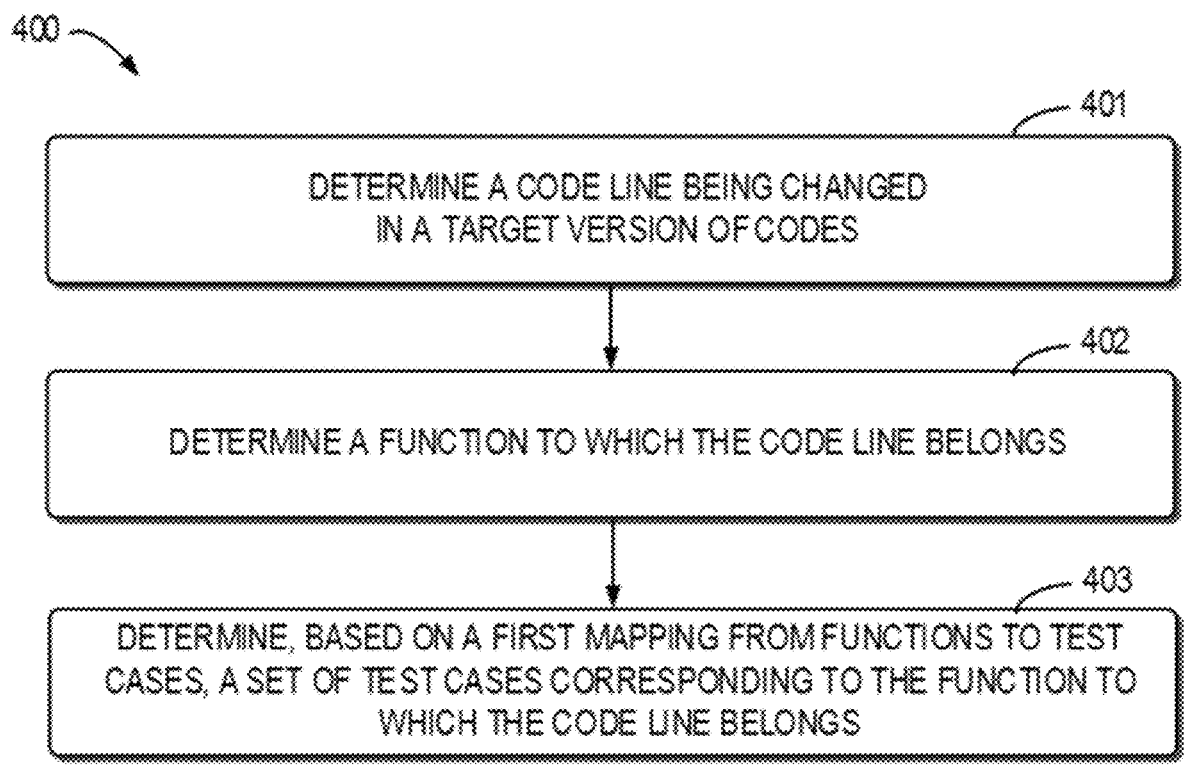
FIG. 4 illustrates a flow diagram of a method 400 for white-box test according to an exemplary embodiment of the present disclosure.

FIG. 4 illustrates a flow diagram of a method 400 for white-box test according to an embodiment of the present disclosure. For example, method 400 may be carried out by computer system/server 12 described with reference to FIG. 1. According to method 400, in step 401, a code line being changed in a target version of codes is determined. In step 402, a function to which the code line belongs is determined. In step 403, based on a first mapping from functions to test cases, a set of test cases corresponding to the function to which the code line belongs is determined.

According to an embodiment of the present disclosure, a target version of the codes may be compared with an original version of the codes, and a code line being changed in a target version of the codes may be determined based on comparison results. In an example embodiment, a "diff" command in a code version management tool "git" may be used to compare the target version of the codes with an original version of the codes. In a further embodiment, through the comparison, it may be determined which code lines are deleted in the target version of the codes from an original version of the codes, which code lines are modified in the target version of the codes from the original version of the codes and which code lines are newly added in the target version of the codes compared to the original version of the codes. In step 402, a function to which the code line belongs is determined. In an example embodiment, as described above, a function to which a code line belongs may be determined based on a list of functions in the codes as obtained from the analyzing.

In step 403, based on a first mapping from functions to test cases, a set of test cases corresponding to the function to which the code line belongs is determined. In one embodiment, a first mapping from functions to test cases may be established using method 200. In a further embodiment, a first mapping indicates a set of test cases associated with each of the functions in the codes. In a further embodiment, a set of test cases affected by a changed code line may be determined based on a first mapping from functions to test cases according to a determined function to which a changed code line belongs. According to an embodiment, for example, a first set of test cases may be determined according to code lines deleted from an original version of the codes. In a further embodiment, a second set of test cases may be determined according to code lines added to a target version of the codes. In a further embodiment, first and second sets of test cases may be combined (e.g., determining a union of the first and second sets of test cases). In a further embodiment, if some test cases that have been deleted from a set of test cases for a target version of the codes exist in a combined set of test cases, the test cases may be deleted from a combined set of test cases in order to generate a final set of test cases. In a further embodiment, a final set of test cases may cover software features affected by a code change.

Figure 5:
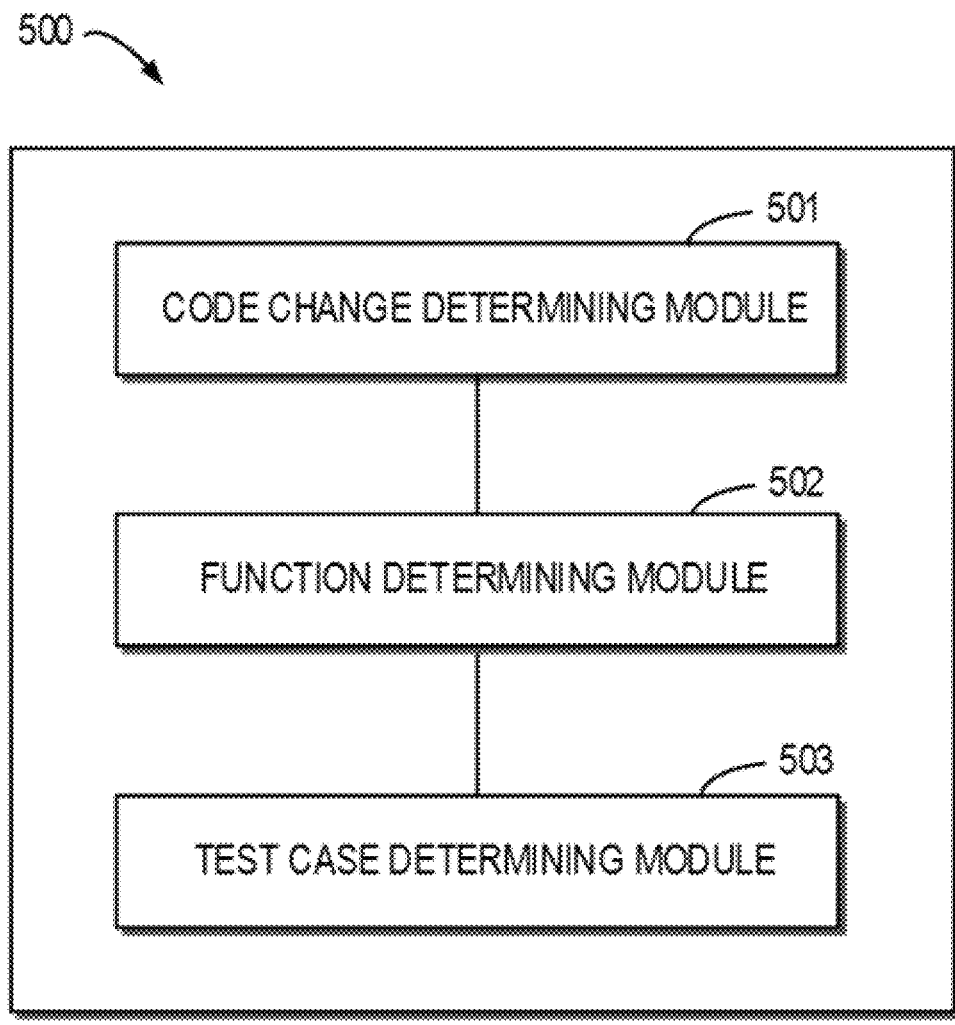
FIG. 5 illustrates a block diagram of an apparatus 500 for white-box test according to an exemplary embodiment of the present disclosure.

FIG. 5 illustrates a block diagram of an apparatus 500 for white-box testing according to an embodiment of the present disclosure. As illustrated in FIG. 5, apparatus 500 includes: code change determining module 501 configured to determine a code line being changed in a target version of codes; function determining module 502 configured to determine a function to which the code line belongs; and test case determining module 503 configured to determine, based on a first mapping from functions to test cases, a set of test cases corresponding to the function to which the code line belongs.

According to an embodiment code change determining module 501 may be configured to compare the target version of the codes with an original version of the codes; and may be configured to determine, based on a result of the comparing, the code line being changed in the target version of the codes. According to an embodiment, code change determining module 501 may be further configured to determine a code line being deleted from the original version of the codes; and may be configured to determine a code line being modified from the original version of the codes; and may be also configured to determine a code line being added from the original version of the codes.

According to an embodiment, apparatus 500 may further include a first mapping establishing module that may be configured to establish a first mapping from functions to test cases. According to an embodiment, first mapping establishing module may be configured to establish a second mapping from test cases to functions; and generate a first mapping based on a second mapping.

According to an embodiment, establishing a second mapping from test cases to functions may include: determining, for an original version of the codes, a function call relationship in the codes. A further embodiment may include determining, based on a function call relationship and for each of the test cases, a set of functions corresponding to a test case.

A further embodiment may include generating, based on a set of functions corresponding to each of the test cases, a second mapping.

According to an embodiment, determining a function call relationship in the codes may include: analyzing a statement in the codes with a state machine. A further embodiment may include determining, based on a result of analyzing, a list of functions included in the codes. A further embodiment may include determining, based on a list of functions, a function call relationship in the codes. According to an embodiment, a first mapping establishing module may be further configured to establish a first mapping for an original version of the codes. A further embodiment may include updating a first mapping for a target version of the codes.

In view of the above, embodiments according to the present disclosure provide a method and apparatus for white-box testing. Embodiments of the present disclosure select limited test cases based on a function call relationship to cover software features affected by a code change, thereby enhancing efficiency of automatic test compared to known techniques.

Embodiments of the present disclosure may be a method, an apparatus and/or a computer program product. The computer program product may include a computer readable storage medium (or media) having computer readable program instructions thereon for causing a processor to carry out embodiments of the present disclosure that have been disclosed above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on a remote computer or server. In the latter scenario, a remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects and embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via a processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for white-box testing, the method comprising:
    determining a code line being changed in a target version of a code;
    determining a function to which the code line belongs;
    establishing a first mapping between functions and test cases;
    determining, based on the first mapping comprising a mapping between functions and test cases, a set of test cases corresponding to the function to which the code line belongs, wherein the function, to which the code line belongs, related to each test case in the set of test cases is determined based on a function call trace obtained from executing at least one test case in the set of test cases; and
    establishing a second mapping from test cases to functions, wherein establishing a second mapping from test cases to functions comprises determining, for the original version of the code, a function call relationship in the code by,
        analyzing a statement in the code with a state machine;
        determining, based on a result of the analysis, a list of functions included in the code; and
        determining, based on the list of functions, the function call relationship in the code, wherein the list of functions includes, at least in part, an indent usage in the code.

2. The method according to claim 1, wherein determining a code line being changed in a target version of codes comprises:
    comparing the target version of the code with an original version of the code; and
    determining, based on a result of the comparing, the code line being changed in the target version of the code.

3. The method according to claim 2, wherein determining the code line being changed in the target version of the code comprises at least one of:

determining a code line being deleted from the original version of the code;

determining a code line being modified from the original version of the code; and determining a code line being added to the original version of the code.

4. The method according to claim 1, wherein establishing the first mapping and second mapping between functions and test cases comprises:

generating the first mapping based on the second mapping.

5. The method according to claim 1, wherein establishing a second mapping from test cases to functions comprises:

determining, based on the function call relationship and for each of the test cases, a set of functions corresponding to the test case; and generating, based on the set of functions corresponding to each of the test cases, the second mapping.

6. The method according to claim 1, wherein establishing the first mapping from functions to test cases comprises:

establishing the first mapping for the original version of the code; and updating the first mapping for the target version of the code.

7. An apparatus for white-box testing comprising a processor and a non-transitory computer-readable medium encoded with a plurality of instructions stored thereon for commanding one or more data processors to perform operations comprising:

determining a code line being changed in a target version of a code;

determining a function to which the code line belongs;

establishing a first mapping between functions and test cases;

determining, based on the first mapping comprising a mapping between functions and test cases, a set of test cases corresponding to the function to which the code line belongs, wherein the function, to which the code line belongs, related to each test case in the set of test cases is determined based on a function call trace obtained from executing at least one test case in the set of test cases; and establishing a second mapping from test cases to functions, wherein establishing a second mapping from test cases to functions comprises determining, for the original version of the code, a function call relationship in the code by, analyzing a statement in the code with a state machine;

determining, based on a result of the analysis, a list of functions included in the code; and determining, based on the list of functions, the function call relationship in the code, wherein the list of functions includes, at least in part, an indent usage in the code.

8. The apparatus according to claim 7, wherein determining a code line being changed in a target version of codes comprises:

comparing the target version of the code with an original version of the code; and determining, based on a result of the comparing, the code line being changed in the target version of the code.

9. The apparatus according to claim 8, wherein determining the code line being changed in the target version of the code comprises at least one of:

determining a code line being deleted from the original version of the code;

determining a code line being modified from the original version of the code; and determining a code line being added to the original version of the code.

10. The apparatus according to claim 7, wherein establishing the first mapping and second mapping between functions and test cases comprises:

generating the first mapping based on the second mapping.

11. The apparatus according to claim 7, wherein establishing a second mapping from test cases to functions comprises:

determining, based on the function call relationship and for each of the test cases, a set of functions corresponding to the test case; and generating, based on the set of functions corresponding to each of the test cases, the second mapping.

12. The apparatus according to claim 7, wherein establishing the first mapping from functions to test cases comprises:

establishing the first mapping for the original version of the code; and updating the first mapping for the target version of the code.

13. A computer program product for white-box test, the computer program product being tangibly stored on a non-transient computer-readable medium and comprising:

machine-executable instructions that, when being executed, is configured for determining a code line being changed in a target version of a code by comparing the target version of the code with an original version of the code; and determining, based on a result of the comparing, the code line being changed in the target version of the code;

determining a function to which the code line belongs;

establishing a first mapping between functions and test cases;

determining, based on the first mapping comprising a mapping between functions and test cases, a set of test cases corresponding to the function to which the code line belongs, wherein the function, to which the code line belongs, related to each test case in the set of test cases is determined based on a function call trace obtained from executing at least one test case in the set of test cases; and establishing a second mapping from test cases to functions, wherein establishing a second mapping from test cases to functions comprises determining, for the original version of the code, a function call relationship in the code by, analyzing a statement in the code with a state machine;

determining, based on a result of the analysis, a list of functions included in the code; and determining, based on the list of functions, the function call relationship in the code, wherein the list of functions includes, at least in part, an indent usage in the code.

14. The computer program product according to claim 13, wherein determining the code line being changed in the target version of the code comprises at least one of:

determining a code line being deleted from the original version of the code;

determining a code line being modified from the original version of the code; and determining a code line being added to the original version of the code.

15. The computer program product according to claim 13, further configured for:
    generating the first mapping based on the second mapping.

16. The computer program product according to claim 13, wherein establishing a second mapping from test cases to functions further comprises:
    determining, based on the function call relationship and for each of the test cases, a set of functions corresponding to the test case; and
    generating, based on the set of functions corresponding to each of the test cases, the second mapping.

* * * * *